Sept. 13, 1949.　　　R. TURNER ET AL　　　2,481,798
ROTARY WEED CUTTER
Filed March 5, 1948　　　2 Sheets-Sheet 1
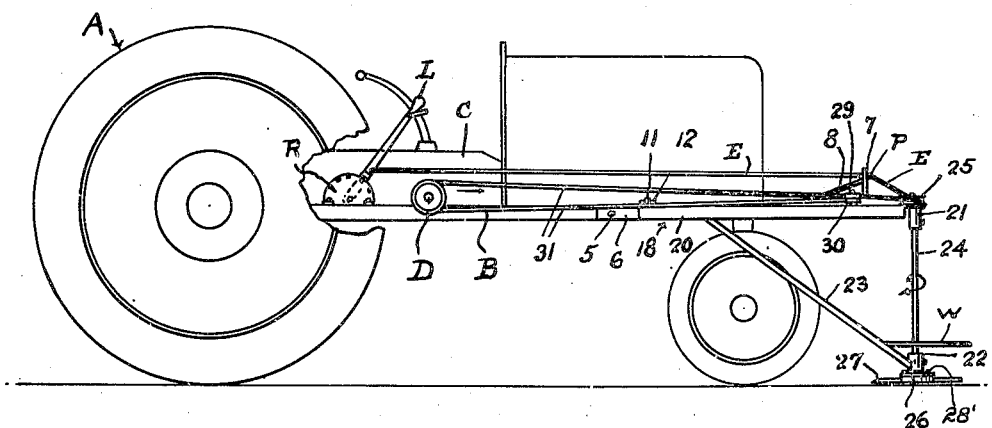
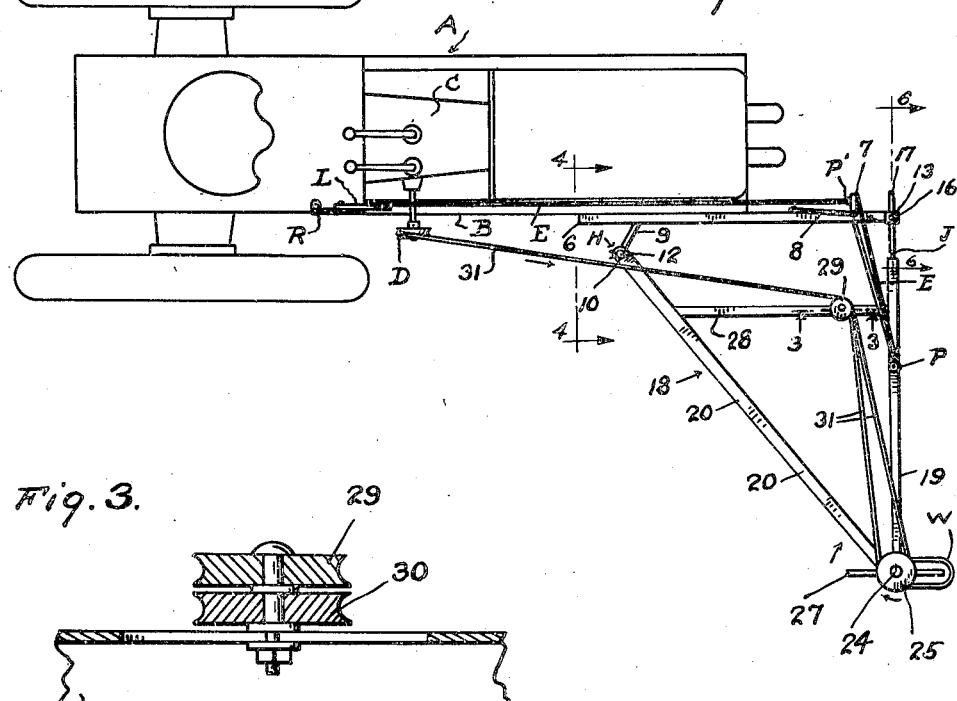
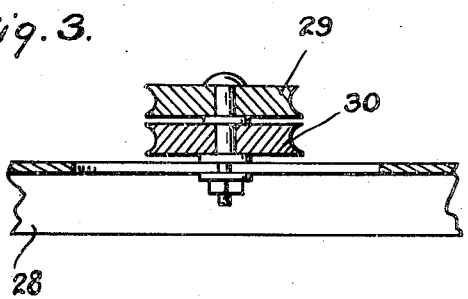
Inventors
Ralph Turner &
Lloyd Howell
By L. B. James
Attorney

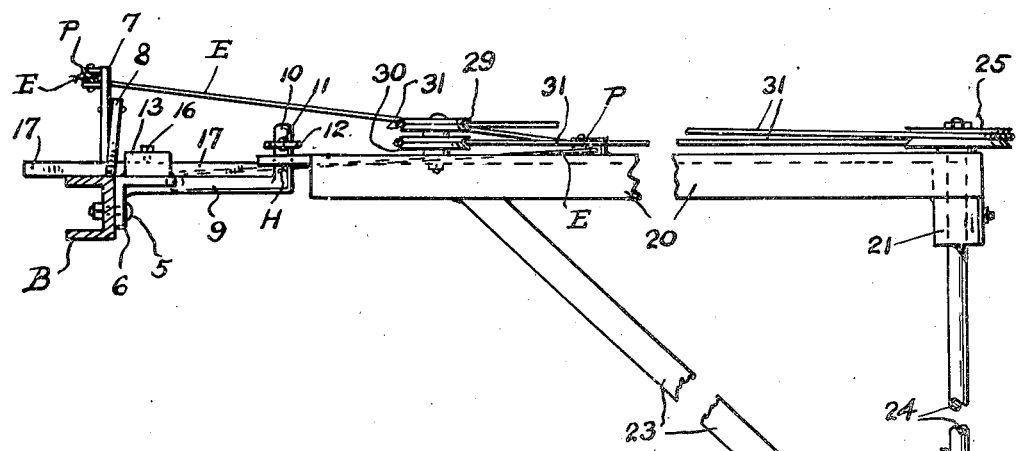
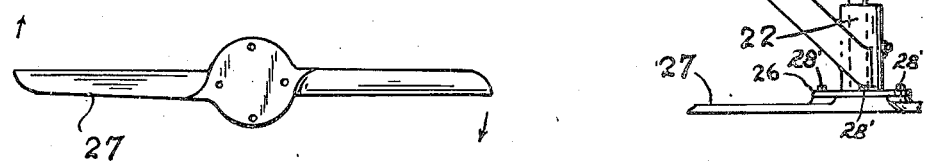
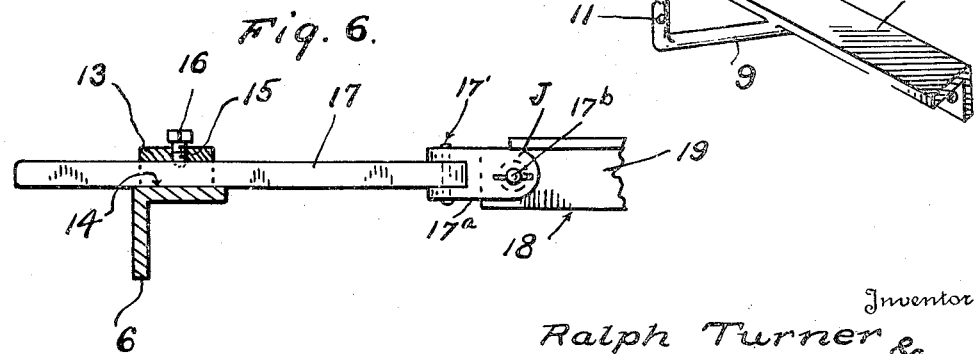

Patented Sept. 13, 1949

2,481,798

UNITED STATES PATENT OFFICE 2,481,798

ROTARY WEED CUTTER

Ralph Turner and Lloyd Howell, Cornell, Ill.

Application March 5, 1948, Serial No. 13,298

2 Claims. (Cl. 56—25.4)

This invention relates to mowing machines and more particularly to rotary weed cutters.

One of the objects of this invention resides in so constructing a rotary weed cutter that it can be removably attached to a tractor and adjusted to various positions by the driver on the tractor.

Another object of this invention resides in the provision of a rotary weed cutter adapted to be mounted on the front right side of a row crop tractor so as to permit the operator thereof to mow rows close to fences in their corn and bean fields or other rowed crops.

A further object of this invention resides in the provision of a rotary weed cutter adapted to not only operate in mowing rows close to fences in fields of corn, beans and the like, but may be used in ditches and other irregular surfaces in the ground.

A still further object of this invention resides in the provision of a rotary weed cutter adapted to be quickly adjusted by the tractor driver to meet varying conditions of mowing about farms.

Asides from the foregoing objects, this invention resides in the provision of means for attaching the rotary blade of the weed cutter to a tractor so it will always remain in sight of the tractor operator for safe operation at its adjusted position relative to the ground.

In addition to the aforesaid objects, this invention resides in the provision of means adapted to transmit a high degree of power and speed from the tractor take-off to the rotary cutting blade so as to obviate repeated mowing of areas just mowed.

One of the salient features of this invention resides in the combination of the stationary unit attached to the tractor and a cutting blade supporting unit adjustably attached to the stationary unit.

With these and other objects in view, this invention resides in certain novel features of construction and arrangement of elements to be hereinafter more particularly set forth in the specification, illustrated in the accompanying drawings and pointed out in the appended claims and, although this disclosure depicts our present conception of the invention, the right is reserved to resort to such departures therefrom as come within the scope of the claims.

In the accompanying drawings forming a part of this application:

Fig. 1 is a side view of a conventional tractor showing the rotary weed cutter secured thereto.

Fig. 2 is a plan view thereof.

Fig. 3 is an enlarged cross sectional view taken approximately on line 3—3 of Fig. 2.

Fig. 4 is a view partly in section taken on the line 4—4 of Fig. 2 and partly in elevation looking from said line towards the forward part of the device.

Fig. 5 is a plan view of the cutter blade removed from the remainder of the device.

Fig. 6 is an enlarged fragmentary section taken approximately on the line 6—6 of Fig. 2.

Fig. 7 is an enlarged perspective view showing the rear end portion of a stationary beam forming part of the invention.

In the present illustration of this invention the letter A designates a conventional tractor which among other well known elements includes a frame B and a power transmission unit C having a power take-off pulley D extending therefrom.

Rigidly secured to the frame B of the tractor, preferably the right side thereof, by bolts 5 or other suitable fastening means is a stationary beam 6 having a standard 7 secured fixedly by any suitable means to its front end and retained in rigid upright position thereon by a brace rod or bar 8. Rigidly secured to the rear portion of the beam 6 is a laterally and rearwardly extending hanger arm 9 having a round upstanding lug 10 with an aperture 11 formed therein to receive a split pin 12 or other similar element. Formed on the forward end of the beam 6 is a bearing block 13 having a laterally extending smooth bore 14 therethrough which is intersected by a threaded bore 15 provided with a set-screw 16 for a purpose to be hereinafter set forth.

Removably and rockably secured to the aforesaid beam 6 through the instrumentality of a lug 10 and a short beam 17 adjustably extending through the block 13 is a substantially triangular frame 18 consisting of beams 19 and 20 adapted to extend laterally from the right side of the tractor on a substantially horizontal plane so it can be manipulated at hinge points H and J, an end portion of the bar fitting somewhat loosely on the lug 10, by a flexible steel cable E secured at one end to the lower portion of the standard 7. The cable leads from the standard to and around a pulley P carried by the beam 19. From thence leads back to a pulley P' carried by the upper end of the standard 7 and from there extends to and is fixed to a hand lever L operated over a rack R which is mounted on the tractor in convenient reach of the operator thereof.

Secured to the outer ends of the beams 19 and 20 is an elongated bearing sleeve 21 which is disposed in alignment with a similar bearing sleeve 22 disposed therebelow and braced from the aforesaid beams by suitable iron straps 23, rods or the like. Rotatably journalled in the aforesaid bearings is a substantially perpendicular shaft 24 on the upper end of which is immovably fixed by any suitable means a pulley 25 while on its lower end is formed a rotary head 26. Secured to the head 28 by bolts 28' is a two bladed cutter. Said cutter is protected by a suitable guard W secured to the iron straps 23 or other suitable portion of the triangular frame and extending thereover such predetermined distance that field growth will pass under the same for engagement by the cutting blade.

Slidably mounted in the bearing block is a short adjustable bar or beam 17 on the outer end of which is carried a vertically disposed pin 17' on which is pivotally mounted the inner end of a yoke 17$^a$. The outer end of this yoke is connected by a horizontal pivotal pin 17$^b$ with the inner end of the frame member 19 to form the hinge J. It is to be observed that the portion of the cable E between the pulleys P and P' extend from the latter at a downward inclination so that stress on the cable E acts at this inclined position to tilt the frame bars 19 and 20 upwardly at their outer ends. This is important, especially when the ground which is cut over by the cutter is uneven, since manipulation of the lever will affect raising and lowering of the cutter to an extent sufficient, for all ordinary variations from level ground, to enable a substantially uniform height of stubble to be left after cutting.

Adjustably mounted on a brace beam 28 securing the beams 19 and 20 together are vertically aligned pulleys 29 and 30 adapted to tighten and guide an endless belt 31 which is trained over these pulleys 19 and 20, pulley 25 and take-off pulley D to transmit regulated speed and power from the motor or power plant of the tractor to the cutting blade.

With an assemblage of elements heretofore mentioned mounted on a tractor, preferably the right side thereof, adjustment of the cutting blade to and from the side of the same is obtained by sliding the short beam through the bearing block 15 and tightening the set-screw 16 against the same while perpendicular adjustment or disposing the cutting blade in inactive position above the ground is accomplished through manual operation of the lever L with the cable E attached thereto, it being understood that rotation and inactivity of the cutting blade is controlled by the conventional shifting means (not shown) of the take-off of the tractor.

Having thus described our invention, what we claim and desire to protect by Letters Patent is:

1. The combination with a tractor having a power take-off thereon, a stationary beam secured to a side member of the tractor, a laterally extending arm rigidly secured to the rear end of said beam, an upstanding lug formed on the free end of the arm and having an aperture therethrough, a bearing block secured to the forward end of the beam and having a laterally extending bore therethrough and threaded aperture therein intersecting said bore, a set-screw threaded into the threaded bore of the bearing block, a short beam slidably extending through the bore in the bearing block and secured in adjusted relation thereto by said set-screw, a substantially triangular frame hingedly connected rearwardly to the aforesaid lug and forwardly to said short beam, means removably securing the frame to the lug and short beam, an elongated bearing secured to the outer end of the frame, a second elongated bearing spaced below said first mentioned bearing in perpendicular alignment therewith, brace straps connecting the last mentioned bearing to the frame, a rotatable shaft mounted in said bearings, a cutter-head formed on the lower end of the shaft, a cutting blade removably attached to the cutter-head for rotation in approximate horizontal planes, a guard secured to the strap braces and extending over the cutting blade in spaced relation therefrom, a standard rigidly secured to the forward portion of the stationary beam, a pulley secured to the triangular frame outwardly of the forwardly hinged point thereof, an adjustable lever mounted on the tractor in reach of the operator thereof, a pulley secured to the upper end of the aforesaid standard, a cable trained over the last mentioned pulleys and having one end thereof secured to said standard and its opposite end secured to a lever, an endless belt trained over the take-off of the tractor and cutting blade rotating pulleys, a brace beam connecting the members of the frame, and adjustable pulleys mounted on the brace beam engaging the endless belt to tighten it.

2. A row harvester adapted for attachment to a tractor having a frame and a power takeoff pulley, said harvester including a supporting beam attached to the said frame at one side thereof and projecting forwardly of said tractor, a short beam carried by the forward end of the supporting beam and adjustable transversely thereof, means to hold the short beam in adjusted position, a triangular frame having a front member hinged to the short beam and extending laterally of the supporting beam, said frame including a diagonal member extending rearwardly from the free end of the front member and connected with the free end of the front member, supporting means at the rear of said supporting beam carrying the adjacent end of the diagonal member and forming a hinged joint, braces extending downwardly from said frame members, vertically aligned bearings carried by said frame members and braces, a shaft journalled in said bearings, a cutter on the lower end of said shaft, tilting means for said frame, said tilting means comprising an adjustable lever on the tractor, a pulley secured to the upper portion of the aforesaid standard, a cable trained over the last mentioned pulley and having one end thereof secured to said standard and its opposite end secured to the lever, a pulley on the front member of the triangular frame and having said cable trained therearound and driving means connecting said shaft to the takeoff pulley.

RALPH TURNER.
LLOYD HOWELL.

REFERENCES CITED

The following references are of record in the file of this patent:

UNITED STATES PATENTS

| Number | Name | Date |
|---|---|---|
| 1,787,677 | Guerin | Jan. 6, 1931 |
| 1,830,871 | Domagala | Nov. 10, 1931 |
| 2,411,623 | Jaques | Nov. 26, 1946 |